Patented July 12, 1938

2,123,857

UNITED STATES PATENT OFFICE 2,123,857

MANUFACTURE OF 1,3-DICHLORO- AND 1,3,5-TRICHLOROBENZENES

Johan Pieter Wibaut, Leonardus M. F. van de Lande, and Gerrit W. A. Wallagh, Amsterdam, Netherlands, assignors to The Dow Chemical Company, Midland, Mich., a corporation of Michigan No Drawing. Application September 29, 1937, Serial No. 166,344

6 Claims. (Cl. 260—161)

This invention concerns a method of making 1,3-dichloro- and 1,3,5-trichlorobenzenes by chlorination of a lower chlorinated benzene, e. g. monochlorobenzene, or benzene itself. The present application is a continuation in part of our co-pending application, Serial No. 23,718, filed May 27, 1935.

It is well known that under the conditions usually employed in chlorinating benzene, the first chlorine atom entering the benzene ring tends to direct the next entering chlorine atom to a position para or ortho thereto, with the result that only a very small yield of 1,3-dichloro- or 1,3,5-trichlorobenzene is obtained. For instance, when chlorobenzene is reacted with an equimolecular proportion of chlorine in the presence of ferric chloride at a temperature below 100° C., a mixture of isomeric dichlorobenzenes, containing a major proportion of the para-isomer, a minor proportion of the ortho-isomer, and usually less than 2 per cent of the meta-isomer, is obtained. When either the ortho- or para-dichlorobenzene is further chlorinated, 1,2,4-trichlorobenzene is formed as the principal trichlorinated product. An object of the present invention is to provide a method whereby benzene or monochlorobenzene may be chlorinated to produce 1,3-dichloro- and 1,3,5-trichlorobenzene in relatively high yield.

We are aware that British Patent No. 388,818, complete accepted March 6, 1933, sets forth that when a vapor mixture of 2 volumes of chlorobenzene and 1 volume of chlorine is passed through a silica tube of 2 centimeters diameter at 500° C. and at a space velocity of 20 reciprocal minutes, 39.1 per cent of the applied chlorobenzene is converted into a mixture of isomeric dichlorobenzenes and 4 per cent into trichlorobenzenes; and that the mixture of dichlorobenzenes comprises 51.8 per cent of the ortho-isomer, 25.7 per cent of the meta-isomer, and 22.5 per cent of the para-isomer. We have repeated this experiment under the exact conditions specified, but did not obtain the result reported by the patent. Instead, the product of the experiment contained much tarry matter, some unreacted monochlorobenzene, and a small proportion of trichlorobenzenes. No dichlorobenzene could be isolated from the product.

However, we have found that benzene or monochlorobenzene may successfully be chlorinated at high temperatures to produce 1,3-dichlorobenzene in a yield even higher than is reported in said British Patent No. 388,818 if certain conditions hereinafter specified are observed in carrying out the chlorination. We have further found that some more highly chlorinated compounds, including the compound 1,3,5-trichlorobenzene, are obtained as by-products from such reaction. The invention, then, consists in the method hereinafter fully described and particularly pointed out in the claims.

The chlorination of benzene or chlorobenzene is carried out according to the invention at temperatures between 400° and 700° C., preferably between 500° and 600° C., using not more than 0.1 the molecular proportion of chlorine theoretically required to convert all of the benzene or chlorobenzene into dichlorobenzene, i. e. using not more than 1 mole of chlorine per 10 moles of chlorobenzene or not more than 1 mole of chlorine per 5 moles of benzene. The employment of a higher proportion of chlorine in this reaction results in excessive by-product formation, e. g. carbonization and tar formation, with resultant loss in yield of the desired products.

The chlorination proceeds most smoothly when carried out in the presence of a porous contact substance such as artificial graphite, pumice, burned clay, charcoal, asbestos, etc. The function of this contact substance is not definitely known, but it appears to absorb and distribute evenly throughout the reacting mixture, heat added to or generated by the reaction, thereby preventing the formation of local hot spots in the mixture and reducing the tendency toward carbonization and tar formation. For instance, artificial graphite, which is a better conductor of heat than pumice, is more effective than pumice as a contact substance in the process, although either substance may be used.

The presence of chlorination catalysts of the metal chloride type, e. g. $FeCl_3$, $CuCl_2$, etc., is preferably avoided in carrying out the chlorination, since we have found that such catalysts promote the formation of para-dichloro- and ortho-dichlorobenzenes. Accordingly, the contact substance employed in the process is one free, or practically free, of such metal chlorides.

In practising the invention, the reactants, e. g.

benzene and chlorine, are preferably first passed separately, but in continuous flow, through preheaters wherein they are vaporized, if liquid, and heated to a temperature of 250° C. or higher. They then pass at the necessary rates of flow into a reaction chamber, heated to a temperature between 400° and 700° C. and packed with a granular or fibrous contact substance of the type hereinbefore mentioned, wherein they are mixed in the proportions already stated and reacted. However, the chlorine may, if desired, initially be dissolved in, or otherwise mixed with, the benzene or chlorobenzene and the resultant mixture may be passed directly into the reaction chamber. The chlorination reaction is exothermic and once started may sometimes be continued without further external heating, provided proper precautions are observed to avoid excessive heat loss through radiation.

The mixture issuing from the reactor is cooled sufficiently to condense the organic components thereof and the residual hydrogen halide is passed onward to a suitable receiver and collected as a valuable by-product. The condensate is then fractionally distilled, whereby a mixture of isomeric dichlorobenzenes, rich in 1,3-dichlorobenzene, and a smaller proportion of trichlorobenzenes, rich in 1,3,5-trichlorobenzene, are obtained. The 1,3-dichlorobenzene and 1,3,5-trichlorobenzene may be separated from their isomers by successive distillations and crystallizations of the respective fractions containing the same. For instance, such dichlorobenzene mixture may be fractionally distilled to obtain substantially pure ortho-dichlorobenzene and a mixture of meta- and para-dichlorobenzenes. The last mentioned mixture may be fractionally crystallized to separate the para-dichlorobenzene (melting point 53° C.) from the meta-dichlorobenzene (melting point below −15° C.).

The following examples illustrate certain ways in which the principle of the invention has been applied, but are not to be construed as limiting the invention.

Example 1

Chlorine and chlorobenzene were passed separately through preheaters, in one of which the chlorobenzene was vaporized and preheated to a temperature of about 250°–300° C., and in the other of which the chlorine was preheated to about the same temperature. The vapors then passed into a tubular reaction chamber, of 22 millimeters internal diameter, which was filled with granular pumice and heated over 50 centimeters of its length to approximately 500° C. The rates of chlorine and chlorobenzene passage were such that 0.6 gram moles of chlorine and 4.0 gram moles of chlorobenzene were passed into the reaction chamber in 3 hours, i. e. the molecular ratio of chlorine to chlorobenzene entering the chamber was approximately 0.15. The vapors issuing from the reaction chamber were cooled sufficiently to condense the chlorinated benzene contained therein. The condensate was washed successively with a 10 per cent aqueous sodium hydroxide solution and water, dried, and fractionally distilled at atmospheric pressure. Fractions distilling at the following temperatures were collected:—

(1) 130.8–135° C.
(2) 135.0–170° C.
(3) 170.0–185° C.
(4) Higher temperatures.

Fraction (1) above consisted almost entirely of unreacted chlorobenzene and fraction (3) consisted largely of a mixture of isomeric dichlorobenzenes. The intermediate fraction (2) was agitated with 95 per cent concentrated sulphuric acid to remove the chlorobenzene therein (the procedure being that disclosed by Van der Linden, Rec. Trav. Chim. 30, 366 (1913)) and the residual dichlorobenzenes were combined with fraction (3), after which the latter was similarly treated with sulphuric acid and then analyzed. The mixture of dichlorobenzenes consisted of approximately 21 per cent the ortho-isomer, 54 per cent the meta-isomer, and 24 per cent the para-isomer. Fraction (4) contained some 1,3,5-trichlorobenzene.

Example 2

A solution of 0.25 gram mole of chlorine in 3 gram moles of chlorobenzene was passed in a period of 5 hours, through a reaction tube similar to that described in Example 1, which tube was packed with granular pumice and heated over 50 centimeters of its length to 600° C. The reacted mixture was cooled to condense the organic components thereof and the condensate was treated as in Example 1 to separate the dichlorobenzene fraction of the product. The mixture of isomeric dichlorobenzenes which was obtained consisted of approximately 15 per cent by weight ortho-, 60 per cent meta-, and 24 per cent para-dichlorobenzene. The over-all yield of dichlorobenzenes was approximately 40 per cent of theoretical, based on the chlorine used.

Instead of employing chlorobenzene as a reactant in the process, benzene itself may be used, in which case chlorobenzene and a mixture of isomeric dichlorobenzenes, rich in the meta-isomer, are the principal products.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method which comprises passing a mixture of an organic compound, selected from the class consisting of benzene and chlorobenzene, and chlorine in a proportion not exceeding 0.1 that theoretically required to convert said organic compound into dichlorobenzene, through a reaction zone wherein it is heated to a temperature between 400° and 700° C.

2. The method which comprises reacting an organic compound selected from the class consisting of benzene and chlorobenzene with chlorine in amount not exceeding 0.1 that theoretically required to convert said organic compound into dichlorobenzene, the chlorination being carried out at a temperature between 400° and 700° C. in the presence of a substantially inert porous material.

3. The method which comprises passing a mixture of benzene and not more than 0.2 molecular equivalent of chlorine through a bed of a substantially inert porous material heated to a temperature between about 500° and about 600° C.

4. The method which comprises passing a mixture of chlorobenzene and not more than 0.1 its molecular equivalent of chlorine through a bed of substantially inert porous material heated to a temperature between about 500° and about 600° C.

5. The method which comprises passing a mixture of benzene and not more than 0.2 molecular equivalent of chlorine through a bed of a substantially inert porous material heated to a temperature between about 500° and about 600° C., and thereafter separating meta-dichlorobenzene from the product.

6. The method which comprises passing a mixture of chlorobenzene and not more than 0.1 its molecular equivalent of chlorine through a bed of substantially inert porous material heated to a temperature between about 500° and about 600° C., and thereafter separating meta-dichlorobenzene from the product.

JOHAN PIETER WIBAUT.
LEONARDUS M. F. van de LANDE.
GERRIT W. A. WALLAGH.